United States Patent [19]

Tsunekawa

[11] Patent Number: 5,737,501
[45] Date of Patent: Apr. 7, 1998

[54] PRINTER CONTROL UNIT AND METHOD

[75] Inventor: Kiyohiro Tsunekawa, Kawasaki, Japan

[73] Assignee: Canon Kabushiki Kaisha, Tokyo, Japan

[21] Appl. No.: 677,108

[22] Filed: Jul. 9, 1996

[30] Foreign Application Priority Data

Jul. 14, 1995  [JP]  Japan ................................. 7-178700

[51] Int. Cl.[6] .................................................. G06K 15/00
[52] U.S. Cl. ............................................ 395/102; 395/110
[58] Field of Search ...................................... 395/102, 101,
395/110, 112, 114, 128, 139, 133, 167,
168, 170, 171, 172; 358/470, 451; 382/233,
185; 345/25–26, 127–130, 132, 141–143,
192, 194–195; 400/61–63, 67, 70

[56] References Cited

U.S. PATENT DOCUMENTS 399,167  12/1889  Ito et al. ................................. 382/233
5,027,304  6/1991  Jeng et al. ............................. 395/170

*Primary Examiner*—Arthur G. Evans
*Attorney, Agent, or Firm*—Fitzpatrick, Cella, Harper & Scinto

[57] ABSTRACT

When there occurs a need to perform resolution conversion while a drawing object, such as a character, is formed, deterioration of print quality is reduced by selecting a reforming method according to the type of font. The quality of other pages is prevented from deteriorating in a case in which a drawing object is referenced at the same time from different pages by forming another drawing object. Prevention of deterioration of quality is achieved by selecting a method of forming (for example, by rescaling when the font is scalable) a pattern having a different resolution according to the type of font in a case in which a drawing object is formed on the basis of print data. Further, prevention of deterioration of quality is achieved where a drawing object is shared among a plurality of pages by forming another drawing object when a decreased resolution is desired.

32 Claims, 14 Drawing Sheets

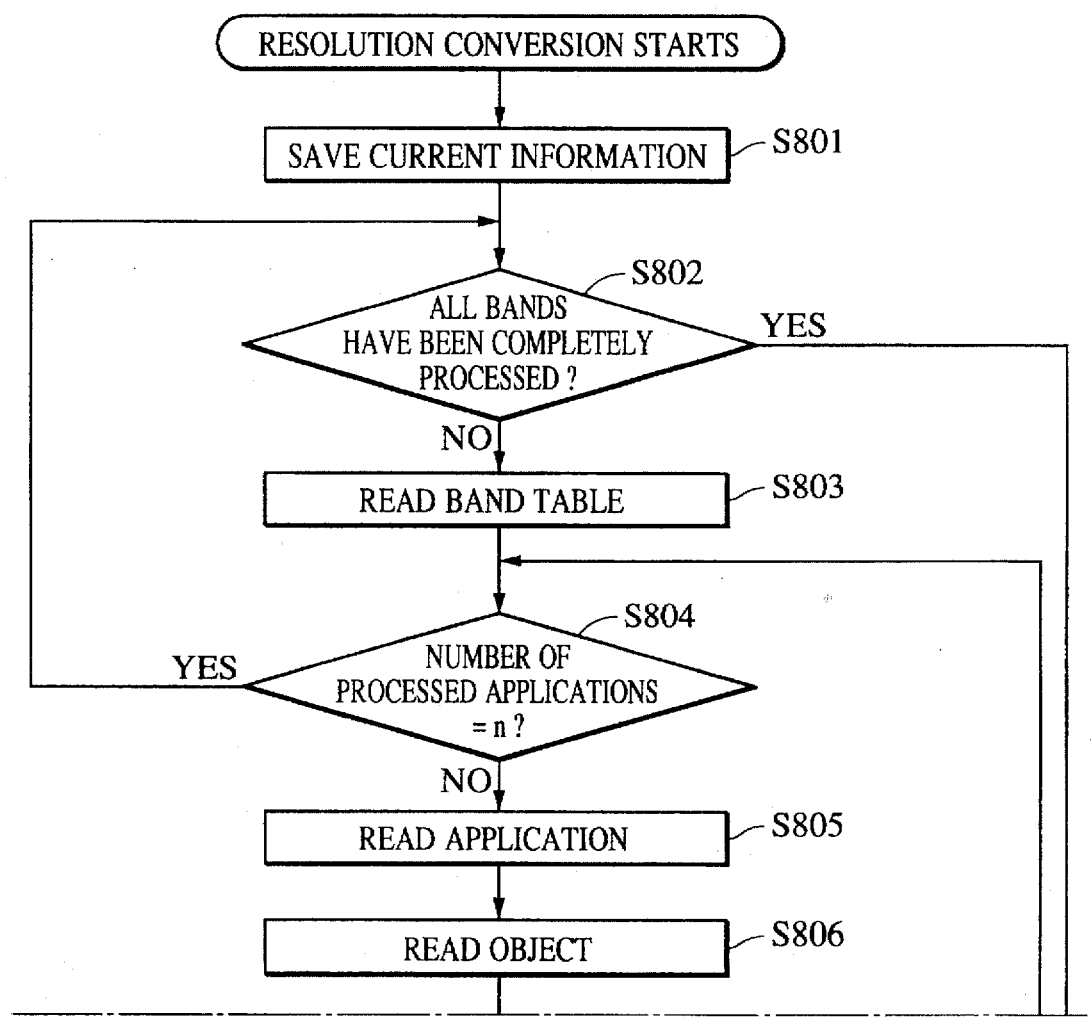

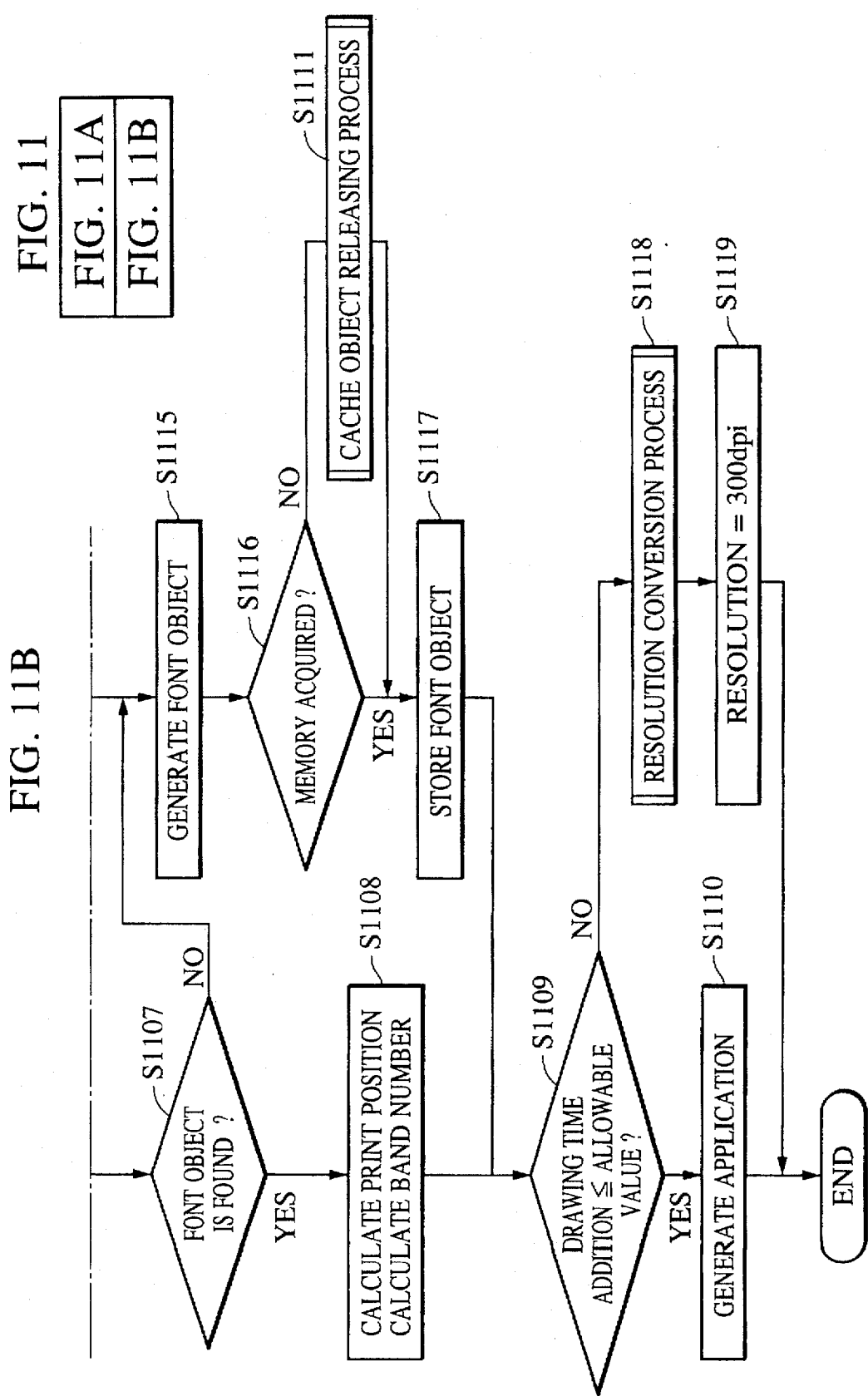

PRINTER CONTROL UNIT AND METHOD

BACKGROUND OF THE INVENTION

1. Field of the Invention

The present invention relates to a printer control unit and method for drawing an image on the basis of a drawing object described in an intermediate data format formed on the basis of external print data.

2. Description of the Related Art

In a printer apparatus for performing a printing operation on the basis of print data received from an external source, hitherto there has been a demand, mainly for the purpose of reducing costs, for a reduction in a memory (RAM) for storing print data, a drawing object formed on the basis of the print data, and a bit image after rasterization. In recent years, the processing resolution of print data is steadily increasing, and therefore the demand for a reduction RAM is increasingly stronger. In the prior art for this purpose, printing based on a banding method described below is performed.

The banding method refers to a method in which two or more band areas which constitute a part of a page to be printed are prepared, a rasterized image in one of the band areas is sent at a fixed speed as a video signal to a print section (printer engine), and at the same time a formed drawing object is rasterized into the other band area. When the sending of one band to the print section is terminated, the image in the band area which has just been rasterized is then sent. Printing is performed with rasterization and sending alternated in this way.

As compared with the banding method, the following method is called a full-paint method in which a memory (raster memory) capable of storing a raster image for one page is prepared, and the raster image after all of the drawing objects have been completely rasterized is sent to the printer engine.

In the banding method, not only is a raster memory for a full page not required, but also because rasterization and sending can be performed at the same time, processing speed can be increased. However, the banding method has the problems cited below.

In a printer apparatus in which it is difficult to stop a print operation in the middle of printout, such as a printer employing an electrophotographic method, since a video signal is transmitted to the printer engine at a fixed speed, the time for rasterization of each band area must be shorter than the video signal transmission time (constant for all the bands) for the other. In a case in which the rasterize time is longer than the video signal transmission time because, for example, the figure which forms the raster image is complex, or a large number of drawing objects is to be drawn, a part of the output result is lost (hereinafter referred to as an "overrun").

Further, in the banding method, since a raster memory for a full page is not prepared, it is necessary to store at least one page of drawing objects which are in an intermediate data format. However, in print data, such as large image data, there is a possibility that not even one page of drawing objects can be stored (hereinafter referred to as a "memory over"). Memory over is not a problem in the full-paint method, because, when a formed drawing object is rasterized into the full page raster memory, the memory which has been used for the drawing object can be reused and the next drawing object can be formed.

As described above, to process print data in which an overrun or memory over occurs (in a system in which there is other insufficient raster memory to use the full paint method) without causing a problem in a system using the banding method, a method, for example, has been employed in which the processing resolution is decreased before data is sent to the printer engine, and the system dynamically shifts to a full-paint method (hereinafter referred to as a "degrade process").

When, for example, a raster image for one page of A4 paper is formed at 600 dpi, a raster memory of approximately 4 MB is required, but approximately 1 MB is required at 300 dpi.

In order to realize the above-described degrade process, the memory size required to store each drawing object on the page, and the time required to rasterize each drawing object in a band are added for the page and each band, respectively, and managed. A check is made to determine if the memory size required to store the drawing objects is greater than a fixed size, or if a band for which the rasterize time for the band is greater than the sending time (a fixed value) for one band is present in the page. When either of the above cases apply, a raster memory for a low resolution is prepared by using a memory for a band raster which is prepared beforehand and a free area of the drawing object storage section which is obtained by performing a thinning-out operation on the drawing object. Moreover, even if a low-resolution raster memory for one page cannot be obtained at the outset the requisite amount of memory can be obtained by rasterizing in sequence the drawing objects whose resolutions have been converted and by deleting the drawing object when the drawing of the final band to which the drawing object belongs is terminated.

Further, in a printer employing a scalable font for generating a character pattern on the basis of the coordinate point sequence information which forms an outline of the character, a function is generally used in which the outline pattern corresponding to a character code which in input requested once is stored in a part of the work memory, and when a request for the same character code is made again as print data, the data within the work memory is referenced again and rasterized (hereinafter referred to as a "font cache function"). As a result, the processing speed is increased, and the work memory of the printer is reduced.

In addition, in the above-mentioned font cache, function by managing from which page a reference is being made, sharing of one font cache across a plurality of pages which are formed successively can also be performed.

However, the above-described prior art has the problems described below. That is, in the degrade process described in the prior art, since a drawing object at 300 dpi is formed by a thinning-out operation on the basis of a drawing object formed initially at 600 dpi, the quality of the output result is forced to deteriorate in correlation with the decrease in the resolution. For example, if the image is thinned out simply, a loss of data occurs. For example, in the 600 dpi to 300 dpi conversion every other line of data disappears. Alternatively, if the image is thinned out by performing interpolation by taking into consideration peripheral dot information, the image is distorted.

The above-described deterioration of the quality of the printed characters is conspicuous in a font with a small print size, while in a font with a relatively large size, because deterioration is not as noticeable, there is a case in which priority is desired to be placed in the processing efficiency of resolution conversion.

Generally speaking, since font data which is input can be deleted at a certain point in time during a printing operation, or different patterns can be input in sequence having the same character code, a thinning-out operation is performed uniformly in order to avoid the rewriting of the pattern contents.

In a case in which a modification specification is input, such as scale-up or scale-down, in the dot font prepared beforehand within the apparatus, since the modified pattern is generated as a drawing object, resolution conversion cannot be performed in other than a thinning-out operation, and therefore there is room for improvement in the memory efficiency.

In a case in which one font object is referenced from a plurality of pages by the above-described font cache function when a plurality of different pages is formed successively, if a resolution decrease is required in a certain page, the operation for decreasing resolution cannot be performed until the rasterization of an earlier page which references the same font object is completed. That is, a page ejection wait state is formed, and this is problematical with respect to processing speed.

In addition, for a printer having a both-sides print section capable of performing printing on both sides of a recording medium, such as paper, there is a case in which the sequence (the sequence in which the drawing objects are formed) of pages printed from the received print data does not match the sequence in which the rasterized images are sent out to the print section. That is, since there is a case in which the second page (the reverse side) is rasterized first, and the first page is rasterized later, it is necessary to store the drawing objects of the first page until the formation of the drawing objects belonging to the second page terminates. In that event, if a resolution decrease occurs for the second page where one font object is shared between the first and second pages due to the font cache function, the resolution of the font object belonging to the first page which has not yet been rasterized is decreased. Therefore, the resolution must be decreased forcedly for the first page in a situation where the resolution is not otherwise required to decrease.

SUMMARY OF THE INVENTION

Accordingly, in view of the above-described problems, it is an object of the present invention to prevent a decrease in print quality by selecting a reforming method according to the type of a font when resolution conversion must be performed in order to form a drawing object, such as a character. It is another object of the present invention to prevent the quality of a first page from deteriorating where a drawing object which is referenced at the same time from the first page and a different page by creating a new reference drawing.

To achieve the above-described objects, in one aspect, the present invention provides a printer control unit comprising: drawing object forming means for forming a drawing object described in an intermediate data format on the basis of input print data; and selection means for selecting font object forming means according to a font type of a reference drawing object which is a font object when there occurs a need to form an image at a resolution different from the resolution at which the drawing object was formed.

In another aspect, the present invention provides a printer control unit comprising: forming means for forming a font object by referring to a shared font object in a state corresponding to print data input earlier when the same character type and the same character code are requested two or more times as print data, and the shared font object has not been deleted; and reforming means for reforming a second font object having a resolution different from that of the shared font object when there occurs a need to form an image at a resolution different from that at which the shared font object was formed.

In a further aspect, the present invention provides a printer control method comprising: a drawing object forming step for forming a drawing object described in an intermediate data format on the basis of input print data; and a selection step of selecting a font object forming step according to a font type of a reference drawing object which is a font object in a case in which there occurs a need to form an image at a resolution different from that at which the reference drawing object was formed.

In a still further aspect, the present invention provides a printer control method for drawing an image by retrieving a font object corresponding to print data input earlier and by referring to the font object when the font object is present in a case in which the same character type and the same character code are requested as print data, the printer control method comprising: a reforming step for reforming a second font object having a resolution different from that of the shared font object when there occurs a need to form an image at a resolution different from that at which the drawing object was formed.

The above and further objects, aspects and novel features of the invention will become more apparent from the following detailed description when read in connection with the accompanying drawings.

BRIEF DESCRIPTION OF THE DRAWINGS

FIGS. 8, 8A and 8B are a flowchart illustrating a low resolution conversion process in the printer control unit in accordance with the second embodiment of the present invention;

FIGS. 11, 11A and 11B are a flowchart illustrating the procedure of accessing the font cache and forming a font object in accordance with the fourth embodiment of the present invention.

DESCRIPTION OF THE PREFERRED EMBODIMENTS

The preferred embodiments of the present invention will be described below with reference to the accompanying drawings.

[First Embodiment]

Figure 1:
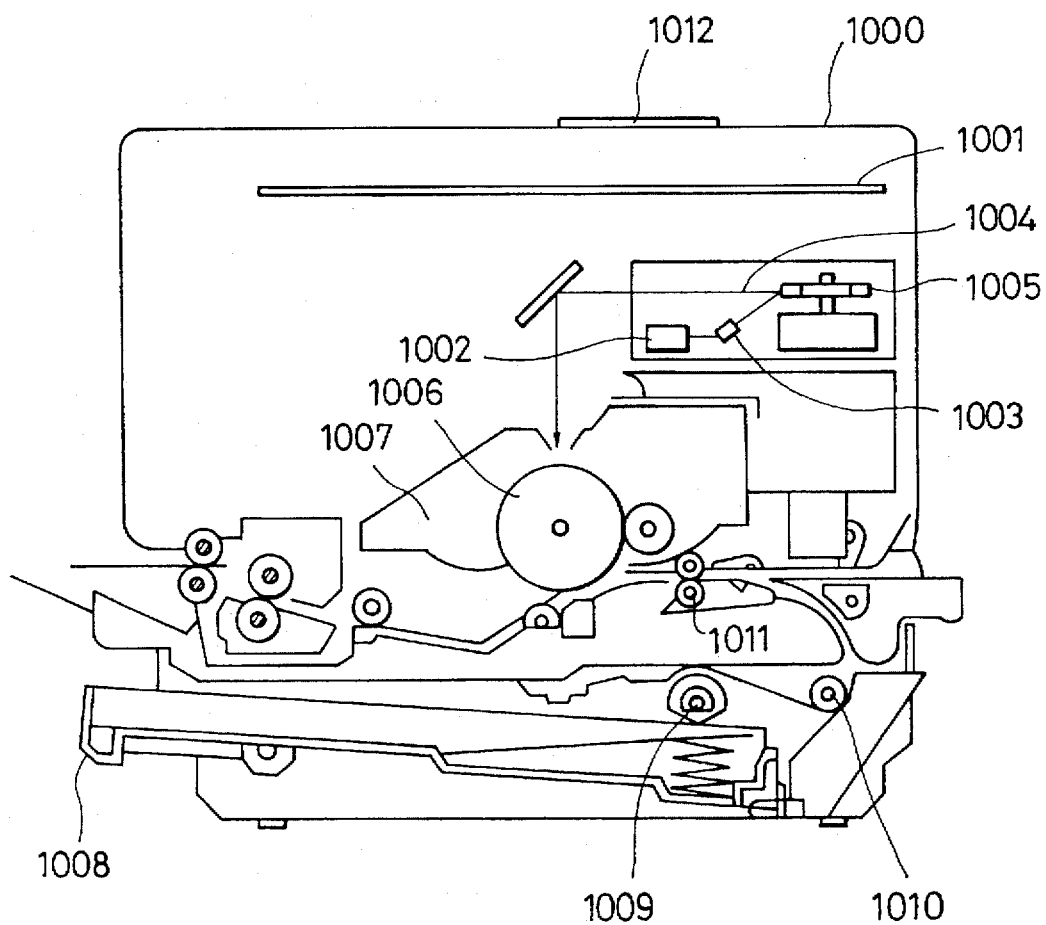
FIG. 1 is a sectional view illustrating the internal construction of a laser beam printer according to the present invention.

FIG. 1 is a sectional view illustrating the construction of a laser beam printer (hereinafter referred to as an "LBP") according to the first embodiment of the present invention. A character processor in accordance with the present invention is not limited to an LBP, but may be a printer apparatus employing another printing method. Further, the present invention may be an individual apparatus or a system in which processes are performed via a network, such as a LAN.

Referring to FIG. 1, reference numeral 1000 denotes an LBP main unit which inputs from a host computer 100 (FIG. 2) character information (the font typeface name, the character size, the character code, and so on), figure data (a circle, a line, a rectangle, and so on), and/or macro commands and stores them internally. Further, the LBP main unit 1000 forms corresponding character patterns, figure patterns or the like on the basis of that information, and forms an image on recording paper which is one type of recording medium. Reference numeral 1012 denotes an operation panel on which switches for operation purposes, LED indicators, and the like are placed. Reference numeral 1001 denotes a printer control unit for controlling the entire LBP main unit 1000 and for analyzing the print data supplied from the host computer 100. The printer control unit 1001 mainly converts character information into video signals of a corresponding character pattern, and outputs the video signals to a laser driver 1002. Further, this LBP is able to accept input character patterns, form data from a data source (not shown), convert such character patterns and data into video signals in accordance with input print data, and output the video signals to the laser driver 1002 in a manner similar to that described above. The laser driver 1002 is a circuit for driving a semiconductor laser 1003, and switches laser light 1004 emitted from the semiconductor laser 1003 on and off on the basis of the input video signals. The laser light 1004 is made to sweep from side to side by a rotary polygon mirror 1005, and thereby scans electrostatic drum 1006. As a result, an electrostatic latent image is formed on the electrostatic drum 1006. This latent image is developed by development unit 1007 around electrostatic drum 1006, and is then transferred onto the recording paper. For recording paper, cut sheets are used, and the cut sheets housed in sheet cassette 1008 mounted in the LBP main unit 1000 are taken into the apparatus by paper-feed roller 1009 and transport rollers 1010 and 1011, and supplied to the electrostatic drum 1006.

Figure 2:
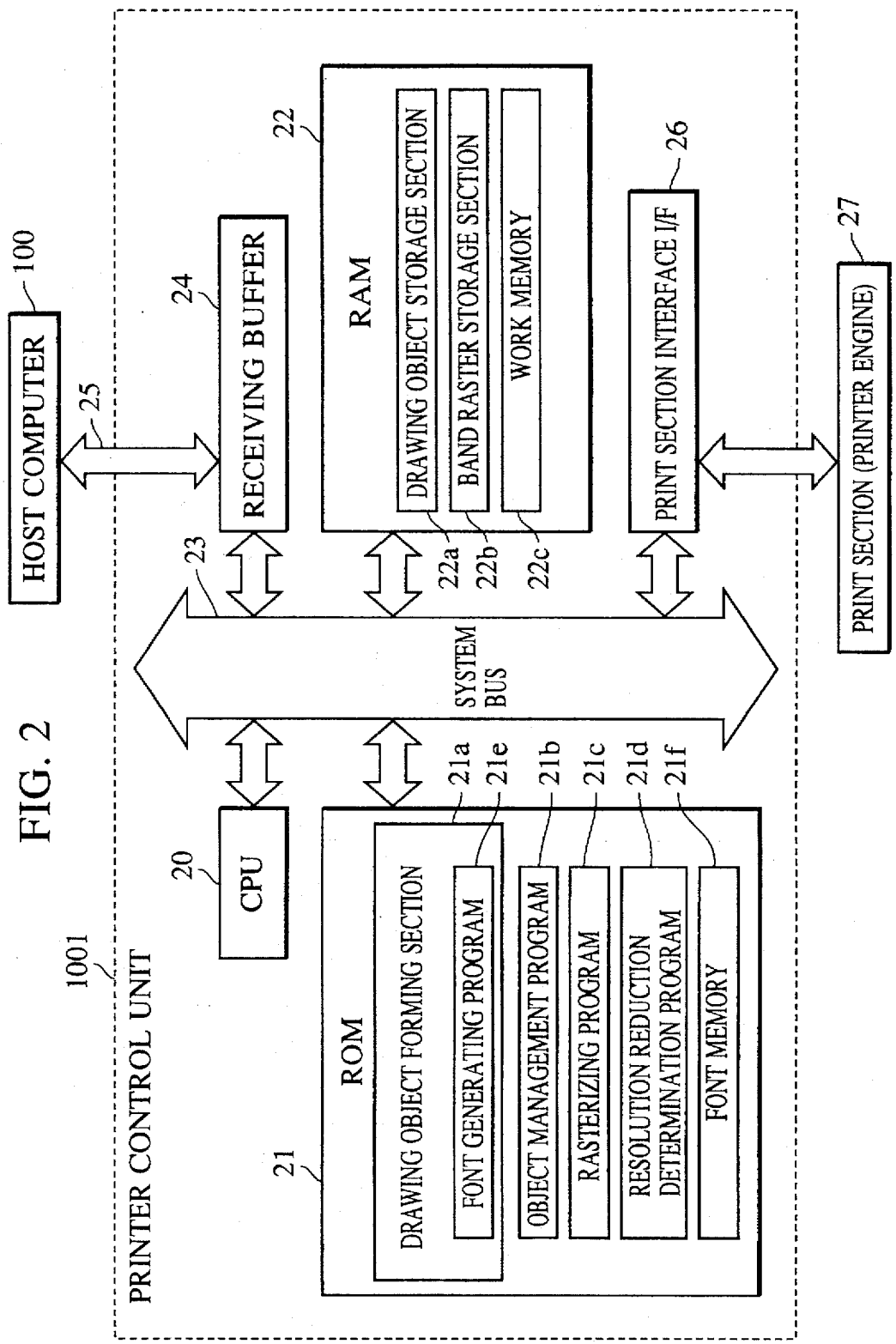
FIG. 2 is a block diagram schematically illustrating a printer control unit in accordance with a first embodiment of the present invention.

FIG. 2 is a block diagram illustrating the internal construction of the printer control unit 1001 of the LBP main unit 1000 shown in FIG. 1.

Referring to FIG. 2, printer control unit 1001, and hence LBP main unit 1000, is connected to the external host computer 100 via a predetermined interface 25, and is designed to perform a predetermined printing operation on the basis of print data received from the host computer 100. The print data received from the host computer 100 is temporarily stored as received data in a receiving buffer 24.

Reference numeral 20 denotes a CPU which performs operations and control for controlling the entire LBP main unit 1000, such as the central control of the access to various devices connected to a system bus 23, in accordance with each control program stored in a ROM 21 which is a read only memory. Stored as control programs in the ROM 21 are the following five types of programs for achieving a system of control in accordance with the flowcharts of FIGS. 3 and 6: a drawing object forming program 21a for forming a drawing object by analyzing print data stored in the receiving buffer 24, an object management program 21b, a rasterizing program 21c for drawing such drawing object, a resolution reduction determination program 21d for making a determination as to whether the resolution must be reduced, and a font generating program 21e, as a part of the drawing object forming program 21a, for forming a font object on the basis of font data contained in font memory 21f. ROM 21 is also used for font memory 21f containing dot font data and scalable font data, such as vector type outline font data or stroke font data.

Reference numeral 26 denotes a print section interface through which rasterized image data is output as video signals to a print section (printer engine) 27. The print section 27 which is the reminder of LBP main unit 1000 prints an image on recording paper 28 on the basis of the video signals received from the print section interface 26.

Reference numeral 22 denotes a RAM which functions as a main memory, and includes a work memory 22c; a drawing object storage section 22a for storing character patterns formed by the font generating program 21e on the basis of the scalable font data within the font memory 21f, data font patterns, and other drawing objects formed by the drawing object forming program 21a on the basis of input figure print data; a band memory 22b for storing a raster image formed by rasterizing the drawing objects; an environment data storage memory (not shown); an NVRAM (nonvolatile random access memory); and so forth. The memory capacity of the RAM 22 can be expanded by an optional RAM connected to an expansion port (not shown). The LBP 1000 receives power supply from a power-supply section (not shown).

The operation of the printer control unit having the construction shown in FIGS. 1 and 2 will now be described with reference to the flowchart of FIG. 3.

Figure 3:
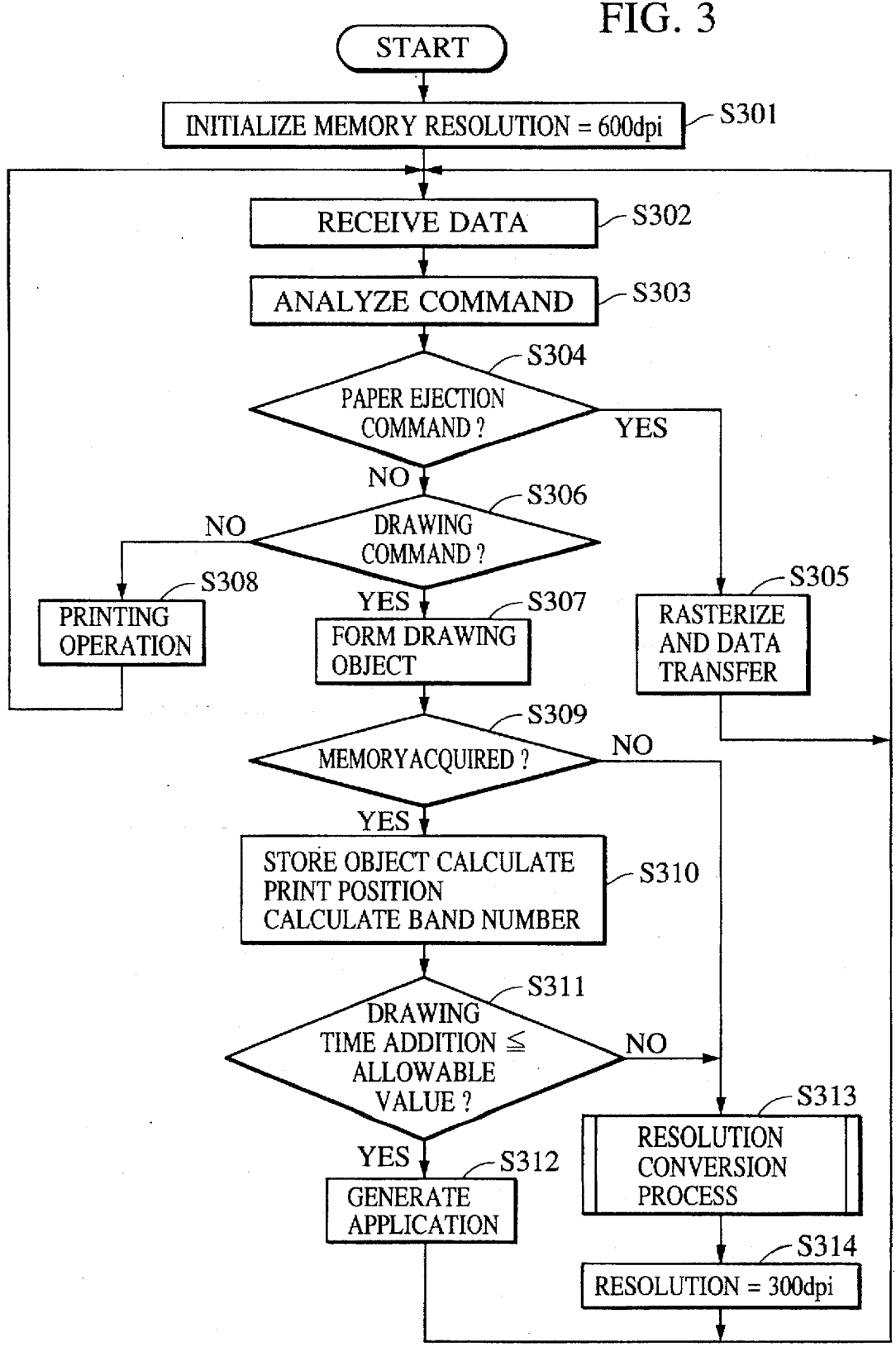
FIG. 3 is a flowchart illustrating the printing operation in the printer control unit in accordance with the first embodiment of the present invention.

Referring to FIG. 3, initially, when power is supplied to the LBP main unit 1000, in step S301, drawing object storage memory 22a and raster memory 22b are initialized, and the resolution of a drawing object to be formed in step S307 is set. In this embodiment, the formation resolution is set at 600 dpi, and the print command specifying by a point size and a unit system of mm or the like is converted into dots by using the value of 600 dpi.

Next, in step S302, print data is received from the external host computer 100, the print data is stored in the receiving buffer 24, and data of a fixed size is read from the receiving buffer 24. The data is temporarily stored in part of the work memory 22a.

In the subsequent step S303, the command present in the data is analyzed in accordance with a predefined grammar.

In step S304, if it is determined that the print data is a paper ejection command, each drawing object belonging to the current page is drawn (rasterized) onto the band raster memory 22b in step S305. When the drawing object formation resolution is 600 dpi without change, the drawing object is rasterized onto the band raster memory 22b as an image of 600 dpi. Then, the band raster which has been completely drawn is sent to the printer engine by an image output section. Drawing objects formed at 300 dpi are expanded so as to become twice as large in the scanning direction and twice as large in the subscanning direction, smoothed, and then sent to the printer engine. A memory for two band rasters was previously prepared in step S301, and while one of the band rasters is being sent to the printer engine, drawing objects are drawn onto the other band. When the paper ejection operation terminates in step S305, the process returns to step S302 where the next print data command is received.

Otherwise, if it is determined in step S306 that the print data is a drawing command, then process flow proceeds to step S307. If the print data is a character drawing command, then in step S307, a font pattern is read out from the font memory 21f and a font object is formed on the basis of the type face of the font, a character size, and a character code, which are specified by the print data. If the print data is a drawing command for other than a character, in step 307 a drawing object (such as a line, a circle, a polygon or the like) specified by the print data is formed.

On the other hand, when it is determined in step S306 that the print data is other than a drawing command, then in step 308, the operations of moving a print position, setting a print environment, or other similar specified operations are performed in accordance with the data, and processing returns to step 302.

Returning to the path followed in the event that the data is a drawing command, in the subsequent step S309, the drawing object memory management program 21b attempts to acquire an ID corresponding to a memory section in the drawing object storage section 22a in order to store the drawing object formed in step S307. If the memory cannot be acquired, the process proceeds to step S313 (discussed below). If the memory can be acquired, in step 310, the drawing object is stored in the memory acquired in step S310. Also in step 310, the band number to which the drawing object belongs is determined on the basis of the print position and the drawing height of the drawing object, and the height of each band raster.

In step S311, the complexity of the drawing object based on the input print data is measured, and a determination is made as to whether the drawing object is more complex than a fixed reference, that is, whether an overrun may occur. More specifically, the drawing object management program 21b predicts the time required to rasterize the drawing object into the band raster storage section 22b, and adds that time to the running total for the applicable band number which total is maintained in a drawing time management table. When one drawing object is drawn across a plurality of bands, the drawing time for each band is determined for each band, and the drawing time for each band is added to the running total corresponding to each that band in the drawing time management table. If the drawing time for all the drawing objects within one band, determined by adding the drawing time for each drawing object in the band in the above-described way, is smaller than the time (the allowable time) in which the band raster is output as video signals, it is determined that the data to be printed is not more complex than the fixed reference, and the process proceeds to the subsequent step S312. If the added drawing time is greater than the allowable time, the process proceeds to step S313.

In step S312, the drawing object management program 21b stores drawing object management information, such as the memory ID, the type of the object, and the drawing position in an object management table. A separate object management table exists for each band on a page, and in rasterization in step S305, only drawing objects which belong to the band to be drawn can be searched at a high speed by searching the object management table which is associated with such band. The object management table itself may be one type of object, the size of which is increased or decreased dynamically as the drawing object management program 21b acquires memory, or may be a table of a fixed size. Thereafter, the process returns to step S302 where the next print data command is received.

The method of measuring the complexity of the drawing object in step 311 will now be described in detail.

If, for example, it is assumed that one band raster has a drawing area for a sheet width W (dots)×n (lines), the time for reading raster data of one line and transferring it as video signals is 2 msec, and n is 256 lines, then the transfer time B of one band raster is 2×256=512 msec, and this is an allowable rasterizing time for determining whether an overrun occurs or not.

On the other hand, the drawing time [here, the time S for drawing a bit map of width w (word)×height h (lines)] for drawing one drawing object in this band raster can be determined from the following equation:

$$S = \alpha + w \times h \times (\beta + \gamma)$$

where $\alpha$ is the time required for obtaining the beginning address of the bit map within the drawing object storage section on the basis of the stored ID by searching the drawing object management table, $\beta$ is the time required for reading out the bit map of one word (32 bits) from the drawing object storage section 22a, and $\gamma$ is the time required for writing a bit map of one word in the band raster storage section 22b.

Figure 4:
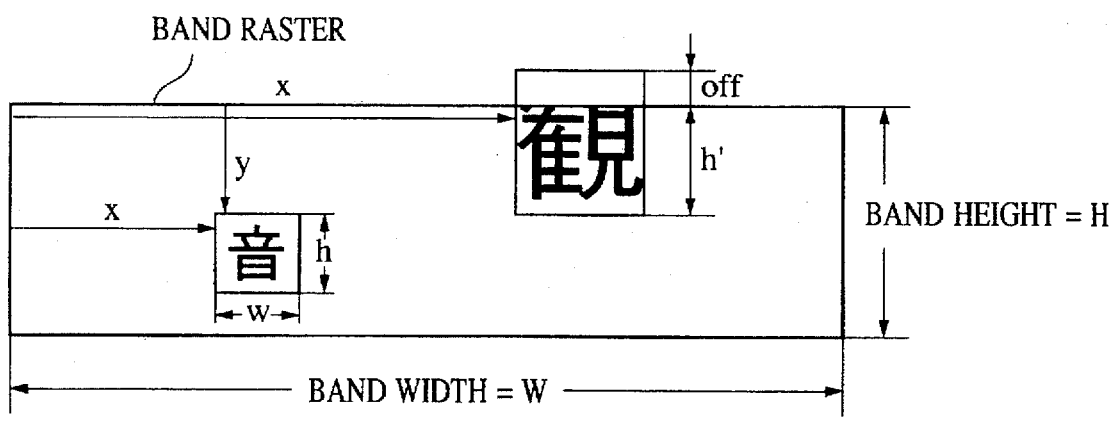
FIG. 4 is a schematic diagram illustrating the information for a band raster storage section and a drawing object management section in the printer control unit in accordance with the first embodiment of the present invention.

The above $\alpha$, $\beta$, and $\gamma$ can be known beforehand from the number of steps of the print control program to be executed and the execution speed (the clock speed) of the CPU, and are stored in the ROM in the same manner as the print control program. In a case in which a bit map of w=4 (words) and h=100 (lines) is drawn when $\alpha$=100 nsec, and $\beta$=$\gamma$=50 nsec, S is 40.1 μsec. If each drawing object is formed of only a bit map, and if 12,768 or more of such bit maps are drawn within one band, an overrun occurs in the band. When one bit map is drawn across a plurality of bands, calculations are made respectively for the effective drawing size (width w'×height h×) contained in each band. This effective drawing size is determined from the width w and the height h stored for the drawing object, the drawing position (x, y) within the band entered in the corresponding drawing object management table, and the writing offset value (off) from the bit map beginning (see FIG. 4).

In the above description, for the sake of simplicity, a bit map is used as an example of a drawing object. However, in addition to this, in the case of a compressed image object, the time required for expansion is further added, and in the case of a run length object, the time required for calculating the readout run length and for obtaining a bit image is further added.

If for each band the drawing time Stotal of all the drawing objects belonging to the band is smaller than the above-described transfer time B of one band raster, it is determined that an overrun will not occur.

Figure 5:
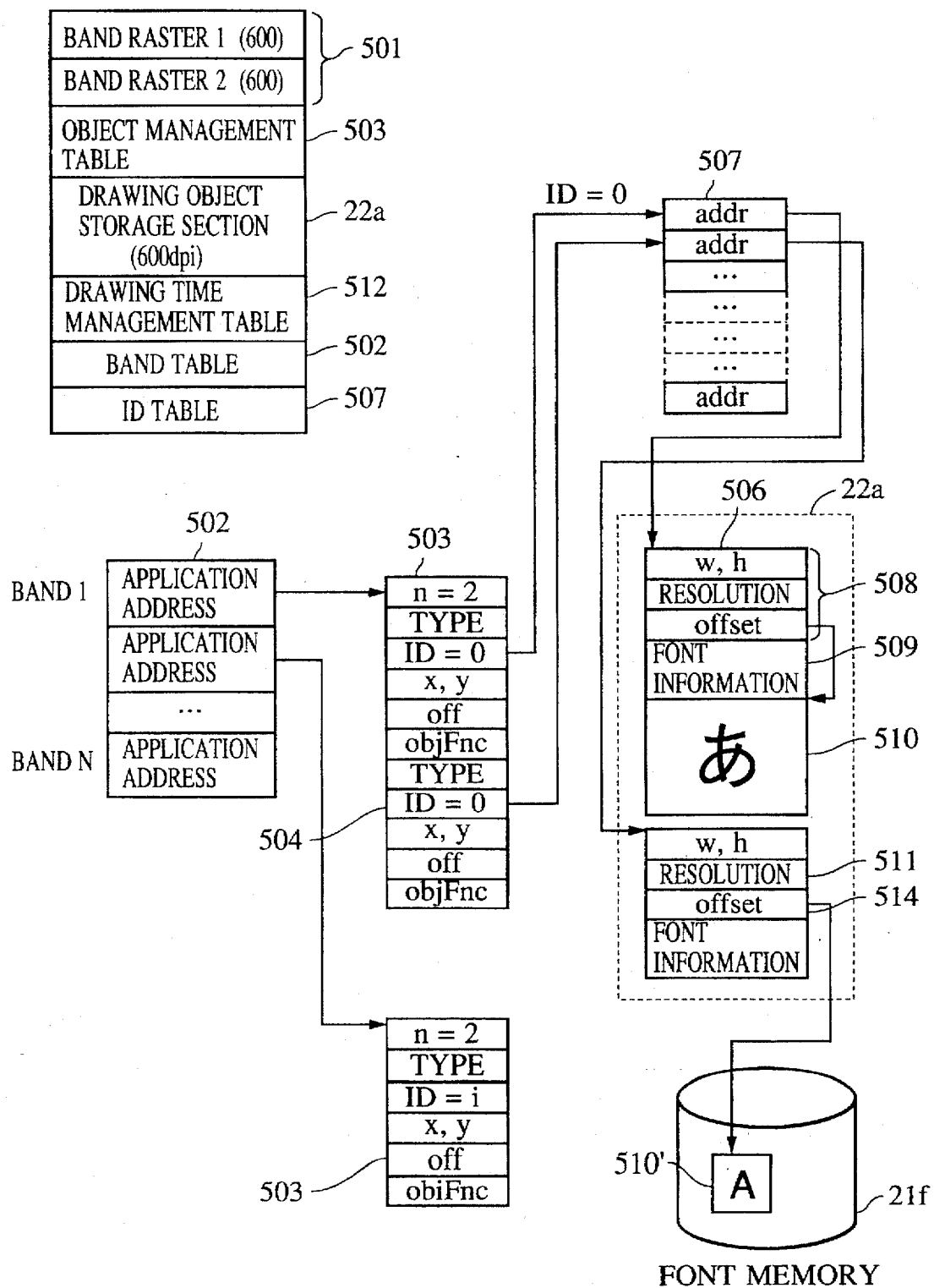
FIG. 5 is a schematic diagram illustrating the structure of a memory for drawing and the link relation among a band table, each application, a drawing object, and an ID table in the printer control unit in accordance with the first embodiment of the present invention.

FIG. 5 is a schematic diagram illustrating a drawing object formed in accordance with the flowchart of FIG. 3, drawing object management tables, the band rasters, as well as the structure of a memory for control, and the link relation among them. Reference numeral 501 denotes two band rasters of 600 dpi which are stored in band raster storage section 22b. Reference numeral 502 denotes a band table for storing the beginning address of the drawing object management table 503 belonging to each band with a number of entries corresponding to the number (N) of bands within one page. Each drawing object management table contains a number n, indicating the number of elements in the table and a component 504 (hereinafter referred to as an "application") for each of said elements. Stored in each application is drawing information [the drawing object type, the drawing object ID, the drawing start position (x, y) within the band, the drawing offset off within the object, and the drawing logic information (objFnc)] for a drawing object 506. When the same character is drawn a plurality of times, naturally, the drawing object is referenced by the same ID in several applications, the number of which corresponds to the the number of such characters to be drawn. When one drawing object is present across a plurality of bands, one application 504 corresponding to the appropriate portion of such drawing object is formed for each band. Reference numeral 22a denotes the drawing object storage section, and reference numeral 506 denotes one drawing object (here, a font object) stored within drawing object storage section 22a. Reference numeral 508 denotes an object header section in which information common among all the drawing objects is stored, for example, the resolution of the drawing object, the width w, the height h, and the address offset of the beginning of a real pattern. Reference numeral 509 denotes an object body section 509 in which information different for each drawing object is stored; in the case of a font object, stored are the font typeface name, the stroke weight, a graphic set (a table for specifying which character pattern should be allocated to which code is called a graphic set) indicating the allocation between the character codes and the real pattern, the point size, the character codes, a flag indicating whether or not the font is a scalable font, a flag indicating whether the pitch is a fixed pitch or a proportional pitch, a flag indicating whether the writing is vertical writing or horizontal writing, as well as an offset value from the reference point, and pitch information obtained during formation. Reference numeral 510 denotes a real pattern of a character stored in the RAM 22. However, when there is a real pattern 510' within the font memory 21f as shown by a drawing object 511, the reap pattern need not be present within the drawing object storage section 505 (offset 514 is set so as to indicate the beginning of the real pattern within the font memory 21f). Reference numeral 507 denotes an ID table 507 for converting the ID written in the application 504 into the address of each drawing object 506. Reference numeral 512 denotes a drawing time management table for storing the drawing time which is calculated for each band in step S311 of FIG. 3, and the table has entries the number of which corresponds to the number N of bands.

Returning to FIG. 3, in the event of an overrun or a memory over, in step S313, a resolution conversion is performed for the page being processed to convert each 600-dpi object which is referenced from among the drawing objects which have already been formed to a 300-dpi object. In the subsequent step S314, the resolution of the drawing object formed in step S307 is reset at 300 dpi. Thereafter, the process returns to step S302 where the next print data command is received.

Figure 6:
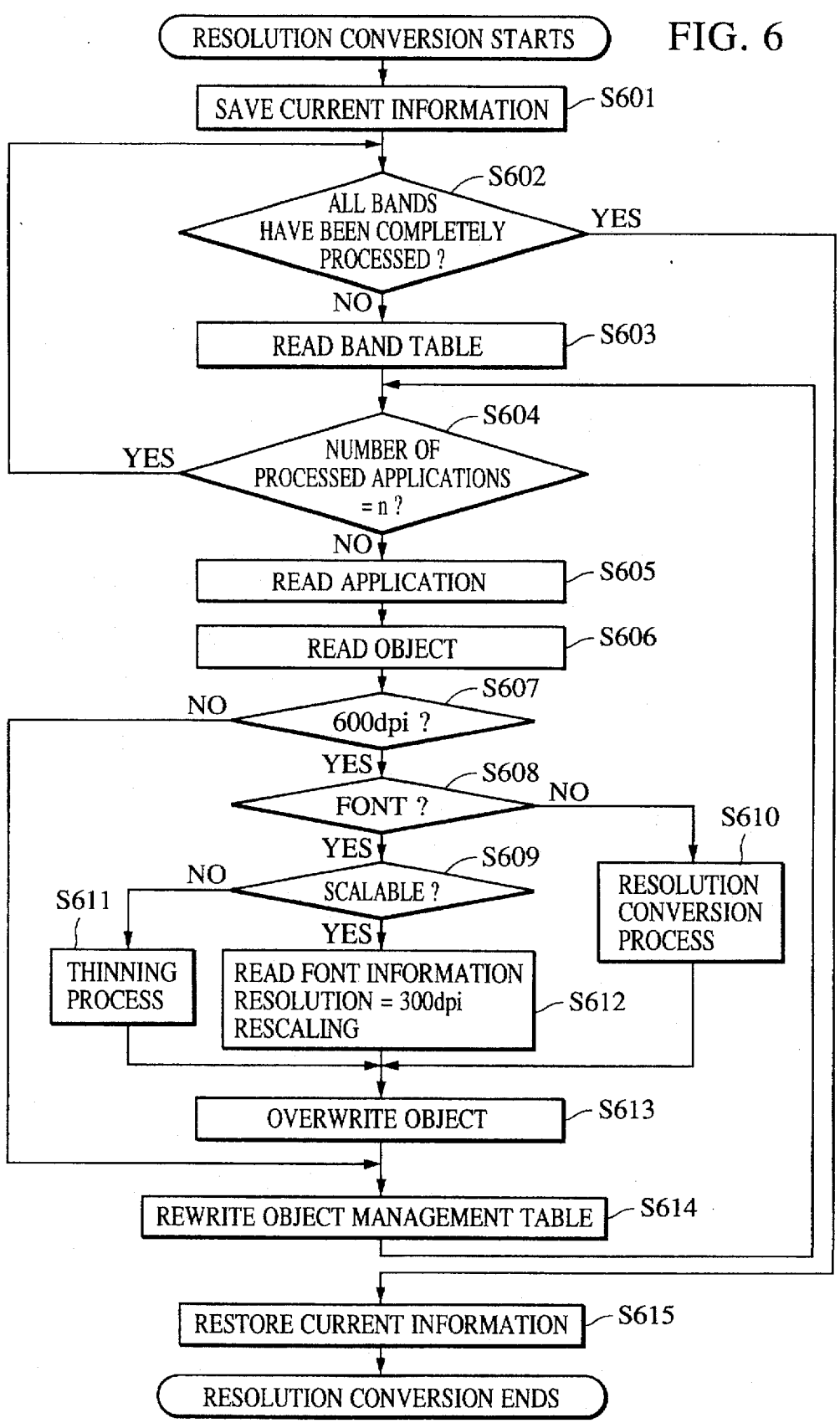
FIG. 6 is a flowchart illustrating a low resolution conversion process in the printer control unit in accordance with the first embodiment of the present invention.

The procedure for changing the resolution of the drawing objects for the current page in step S313 will now be described in detail with reference to the flowchart of FIG. 6.

Initially, in step S602, a check is made to determine the number of bands which have been processed (step S601 will be described later). When there is a band which has not been processed, the process proceeds to step S603, while if all the bands have been completely processed, the process proceeds to the final step S615 (to be described later). In step S603, the band table 502 is read in sequence to obtain the beginning address of each drawing object management table 503. In the subsequent step S604, the number n of applications stored at the beginning of the drawing object management table 503 is obtained, and further a check is made to determine if the number of applications which have been processed is equal to n. If there is an application which has not yet been processed, the process proceeds to step S605 where the application 504 is obtained and then process flow proceeds to step S606. On the other hand, if all the applications within the current band have been completely processed, the process returns to step S602 in order to read out applications belonging to the next unprocessed band, if any.

In step S606, the ID table 507 is accessed by the object ID within the application 504 obtained in step S605, the beginning address of the subject drawing object 506 is obtained, and finally various information (elements 508 and 509) for drawing object 506 is obtained. In the subsequent step S607, the resolution of drawing object 506 is checked. If the resolution is 600 dpi, the process proceeds to the resolution conversion process of step S608 et seq. If the resolution is not 600 dpi (i.e., 300 dpi), the drawing object is determined to be a drawing object on which a resolution conversion process has already been performed, and the process proceeds to step S614.

In step S608, the type of the drawing object 506 is checked. If the drawing object is determined to be a font object, the process proceeds to step S609. If, on the other hand, it is determined in step S608 that the drawing object is not a font object, the process proceeds to a resolution conversion process (step S610) corresponding to the type of the drawing object.

For example, in step S610, a bit map image might be obtained by thinning out the bit map by removing every other scan line for the direction along the height, and by removing every other bit for the direction along the width (simple thinning process). Or, in step S610, the bit map may be thinned out by checking on/off states of the surrounding bits (e.g., right, below, and right below), and by turning on the subject bit if any one bit is on (an interpolation thinning process). The drawing object whose resolution has been converted into 300 dpi is overwritten at the address where the 600 dpi object had been stored, and then in step 613 the information of the object header section 508 is rewritten according to the changed resolution.

In step S609, a check is made to determine if the drawing object is a scalable font on the basis of the font information 509. When the drawing object is not a scalable font, in step S611 a 300-dpi font is formed by a thinning-out operation similar to that for the bit map image. If, on the other hand, the drawing object is a scalable font, in step S612 a rescaling operation is performed using the font information 509. The rescaling operation is the same as the operation for forming a font object in step 307, except that the resolution specified in the font forming section is 300 dpi. Since rescaling is performed at 300 dpi, a character quality can be obtained which is the same as that obtained when scaling is performed at a half size at 600 dpi. Therefore, a font pattern having a high quality, much superior to a case in which a font pattern of 600 dpi is thinned out, can be obtained.

When a font object of 300 dpi is formed in this way, the process proceeds to step S613 where the object header section 508 is rewritten in the same way as for non-font drawing objects.

The rescaling operation occurs in an interrupted manner with respect to the formation of the current font object (600 dpi). If the resolution conversion process occurs while the font object itself is being formed, there is a possibility that the font scaling information (the offset value and the pitch information), current font information (the font type, the graphic set, the character size, the character code, and the like) will be rewritten with the last rescaled values. To avoid this situation, at the start and the end of the rescaling operation, the current information is saved (step S601) and restored (step S615), respectively.

Further, in step S614, the resolution dependent elements of the print position information (the drawing start position (x, y) and the offset (off) in the band) in the drawing object management table 504 are converted, and the corresponding elements in management information table 504 are rewritten. When the low resolution conversion process of one drawing object is terminated in this way, the process returns to step S604 where the next unprocessed application, if any, is read in sequence, and the same resolution conversion process is performed.

As described above, by dynamically reducing the resolution of the drawing object in the page, the free area of the drawing object storage section 22a expands. Also, in the band raster storage section 22b (which can store two band areas at 600 dpi), since rasterization at 300 dpi may be possible, a ¼ reduction is possible, and the free area expands further. Since the rasterize time is also reduced, it is possible to lessen both the memory over and the time over.

[Second Embodiment]

Although in the first embodiment the decrease in quality when resolution is reduced is minimized by rescaling if the font is a scalable font, or by performing a thinning-out operation if the font is a dot font, the present embodiment of the invention may be applied to an input font received as print data from an external unit.

Accordingly, in this embodiment, a resolution reduction process in a printer control unit capable of processing an input font will be described below.

Figure 7:
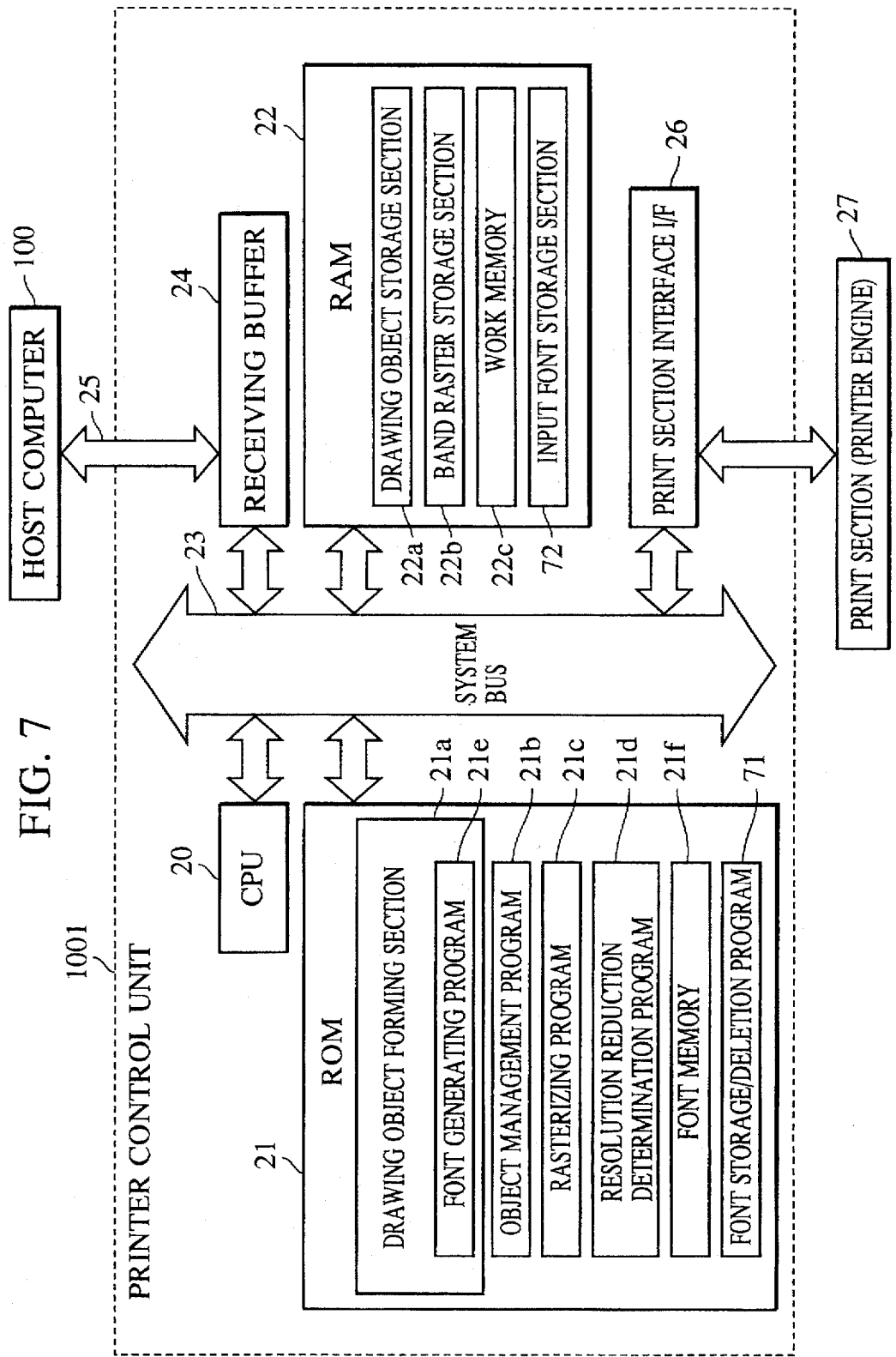
FIG. 7 is a block diagram schematically illustrating a printer control unit in accordance with a second embodiment of the present invention.

FIG. 7 is a block diagram illustrating the internal construction of a printer control unit 1001 in accordance with the second embodiment of the present invention. Components shown in FIG. 7 which are the same as those of the first embodiment shown in FIG. 2 are given the same reference numerals, and an explanation thereof is omitted. The ROM 21 for storing programs and the like includes, in addition to the programs described in the first embodiment, a section containing a font storage and deleting program 71 for storing and deleting font data input as a part of the print data from the host computer 100. Before the printing operation is performed, the user (or the printer driver) enters a font necessary for printing from the host computer. In a case in which the font has already been entered when the user (or the printer driver) enters a font necessary in the specified place (code), the font is deleted. Further, RAM 22 also includes an input font storage section 72 for storing the input font data. Thus, the input font data, the font pattern itself, scalable data, and the like can be stored. In this embodiment, a counter is maintained for each character stored in the input font storage section 72. The font storage and deleting program 71 sets the counter to 1 when the character code is first input. When the character code is re-input, the counter is incremented.

The font generating program 21e of this embodiment, in addition to scaling outline data in the input font data and retrieving a dot font, is capable of forming a scalable font pattern by scanning an input font pattern and generating coordinate point sequence data. The font object formed on the basis of the input font data is stored as a font object in the drawing object storage section 22a; in addition, the scalable font pattern itself is also stored in the drawing object storage section 22a, and the time at which the entry font data stored in the input font storage section 72 is deleted may be different from the time at which the font object is rasterized. The font generating program 21e is capable of indicating that the input font data is not present in the input font storage section 72 by returning an error message with respect to a font generation request when the input font data has been deleted. Further, although the input font data is stored in a part of the RAM 22 in this embodiment, the input font data may instead be stored in another storage medium, such as a hard disk.

The object body section 509 of a font object formed by the printer control unit having the construction shown in FIG. 7 has, in addition to the font information described in the first embodiment, a counter for indicating how many times the font object (i.e., the same character code and the same font attributes), has been input. The counter within the font object can be obtained when the font generating program 21e references the counter in the input font storage section 72 during the formation of the drawing object. Since whether the entry font data has been changed as described above can be determined at any time after the formation of the pattern, whether rescaling is possible can be determined when resolution conversion must be performed. However, in a case in which the input font data has already been deleted from the input font storage section 72 at the time a resolution conversion process is performed, rescaling cannot be performed.

Figure 8B:
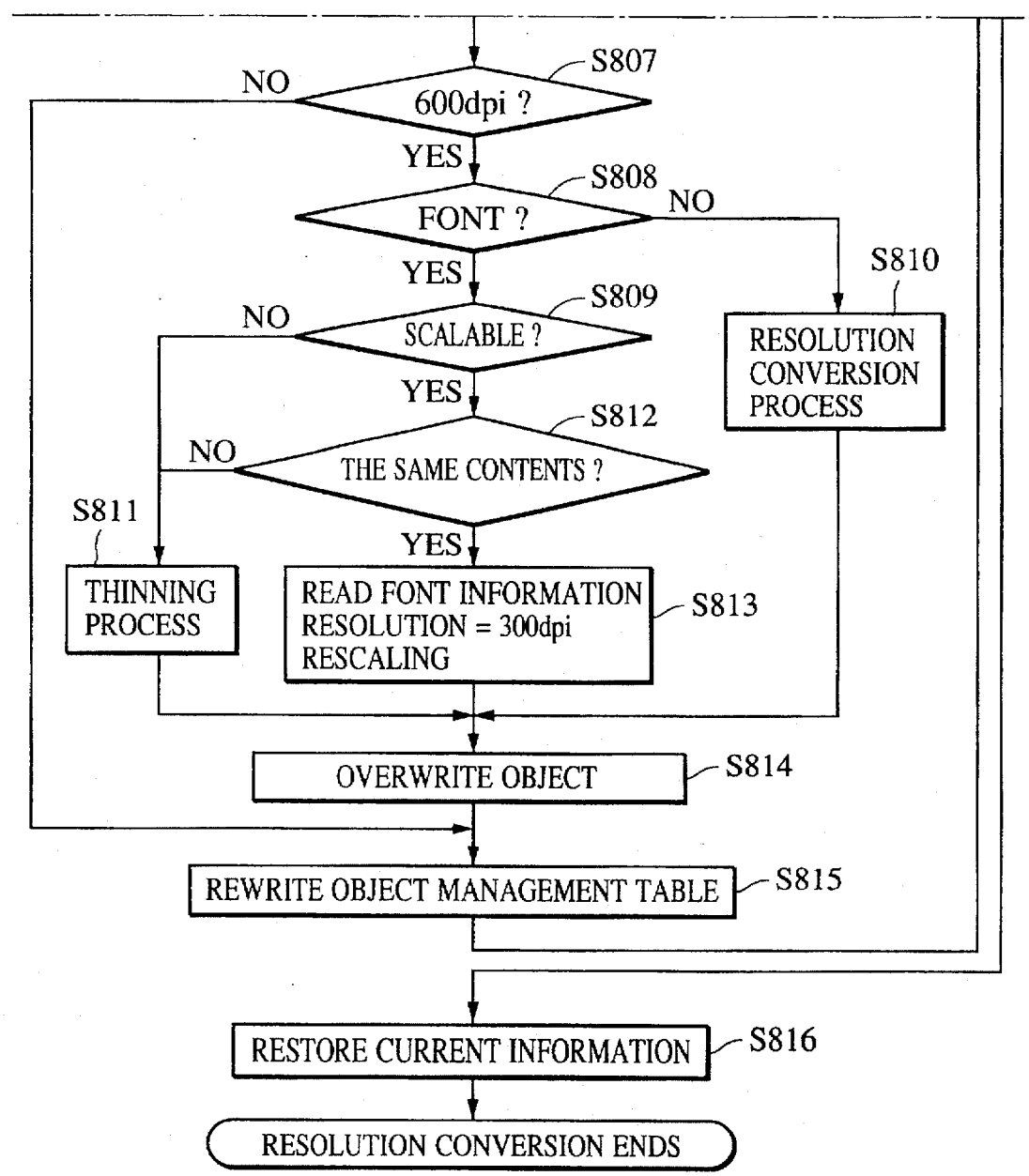

Next, a resolution conversion process of the printer control unit having the construction shown in FIG. 7 will be described with reference to the flowchart of FIG. 8. The steps up to step S808 are the same as the corresponding steps of the flowchart of FIG. 6, and therefore the description thereof is omitted.

When it is determined in step S809 that the drawing object is a scalable font object, a check is made in the subsequent step S812 to determine if the font object is a rescalable font object, namely, if the contents of the font object have been changed. First, a check is made to determine if the subject font object is an input font object. This can be easily determined by setting the counter of the object pre-stored (not an input font object) in the LBP main unit 1000 at zero when the font generating program 21e initially forms the font object. When the subject font object is an input font object, the font generating program 21e checks if the input font data has been deleted from the input font storage section 72, and if the input font data has not been deleted, the font generating program 21e makes a determination as to whether the pattern contents are the same as those within the input font object. Thus, if the entry font has not yet been deleted, as described above, the counter inside the font information section 509 is compared with the counter inside the corresponding input font data in the font storage section. If the values of the counters are the same, it is determined that "there is no pattern change" (since the counter for each pre-stored scalable font object is always 0, for such font objects it is always determined that "there is no pattern change").

In a case in which the subject font object is the same as the stored scalable font in step S809, or in a case in which the subject font object is an input font object which has not yet been deleted and the values of the counters are the same in step S812, meaning that the contents of the font object have not been changed, a rescaling process is performed using the font information 509 in step S813. The scaling process is the same as that performed in step 307, except that the resolution specified in the font generating section here is 300 dpi. On the other hand, if the input font object has been deleted (an error message is returned when a font object is generated), or when the counters do not match each other, assuming that the contents of the font object have been changed, a thinning-out operation is performed in step S811 in the same way as for the bit map font object because a reference to appropriate scalable font data cannot be made, and thus the resolution is converted.

After a font object of 300 dpi is formed in this way, the process proceeds to step S814 where, in the same way as for other drawing objects, each drawing object whose resolution has been converted is overwritten at the address where the 600-dpi object had been stored, and the information of the object header section 508 also is rewritten. In the subsequent step S815, in the same way as in step S614 of the first embodiment, the resolution dependent element of the print position information of the drawing object management 504 are converted, and the corresponding management information elements in such table are rewritten.

As described above, the deterioration of quality when resolution is reduced can be minimized for scalable font objects for which several different patterns corresponding to the same character code are input.

[Third Embodiment]

Although in the first and second embodiments resolution conversion is realized for a bit map font by performing a thinning-out operation, deterioration of quality can be prevented by searching the font memory 21f again when the resolution is reduced. Furthermore, the required drawing object memory size after reformation may be reduced in a case in which a character modification command for scaling (up or down) a font object is contained in print data, or in a printer control unit for performing a scaling process when font object is formed because the resolution of the stored bit map font object is different from the desired printing resolution.

Figure 9:
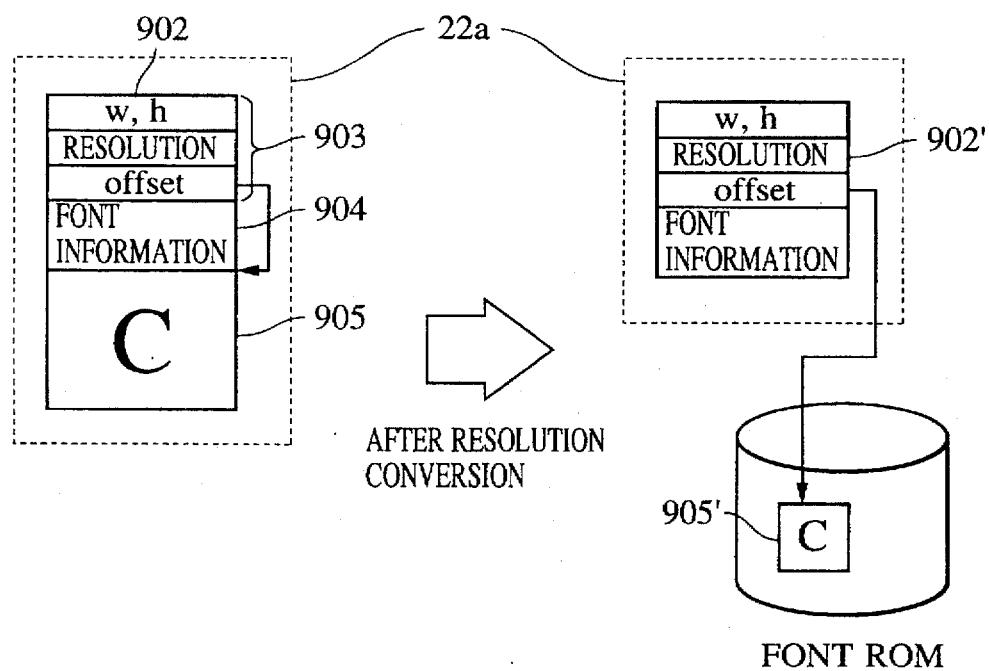
FIG. 9 is a schematic diagram illustrating the structure of a drawing object before and after resolution conversion in a printer control unit in accordance with a third embodiment of the present invention.

FIG. 9 is a schematic diagram illustrating a font object which is formed when a character expansion ratio (for both length and width) of 2 (square expansion) is specified in a print command which references a bit map font object as print data. FIG. 9A shows a case in which a drawing object 902 is at 600 dpi, and when compared with the original font data inside the font memory 21f, the drawing object 902 is expanded twice as large in length and width and stored, as illustrated by pattern 905. FIG. 9B shows a drawing object 902' which is formed at 300 dpi when the resolution is converted. In a resolution reduction process in the printer control unit in which the original resolution of the drawing object is 600 dpi, and the resolution becomes 300 dpi after the resolution is reduced, drawing object 902' (similar to drawing object 511 shown in FIG. 5) shown in FIG. 9 can be formed by obtaining the address inside the font memory 21f and using the scaling information again, as illustrated by pattern 905; rather than by thinning out the font pattern of 600 dpi, and thus it is not necessary to store the font pattern itself in the drawing object storage section 22a. That is, in a case in which the value (the effective expansion ratio) obtained by multiplying the resolution conversion ratio (300/600 dpi=½) when the resolution is lowered by the dot font expansion ratio (2: for both the length and the width) is 1, it is possible to considerably reduce the necessary drawing object memory after the resolution is reduced, and increase the processing speed. Here, the specified expansion ratio is stored as font information in object body section 904, and is referenced during the calculation of the effective expansion ratio.

Although in the first, second and third embodiments various font information (509 in FIG. 5, and 904 in FIG. 9) has been stored for each character for the sake of explanation, information which can be shared among the font types, such as the font name, the graphic set number, and the point size, may be collectively managed in font units by providing another font information management table. In this case, the memory size of the drawing object storage section 22a, which is partially consumed by font objects, can be reduced, but link information (the address specification, the ID management, and the like) to each table entry is required inside each font object in order to obtain font information required during rescaling.

[Fourth Embodiment]

If in the third embodiment, conversely, the font object is made to be retrieved from the font information management table by using a character code as an index, the above-described structure can be made to function as a font cache.

Figure 10:
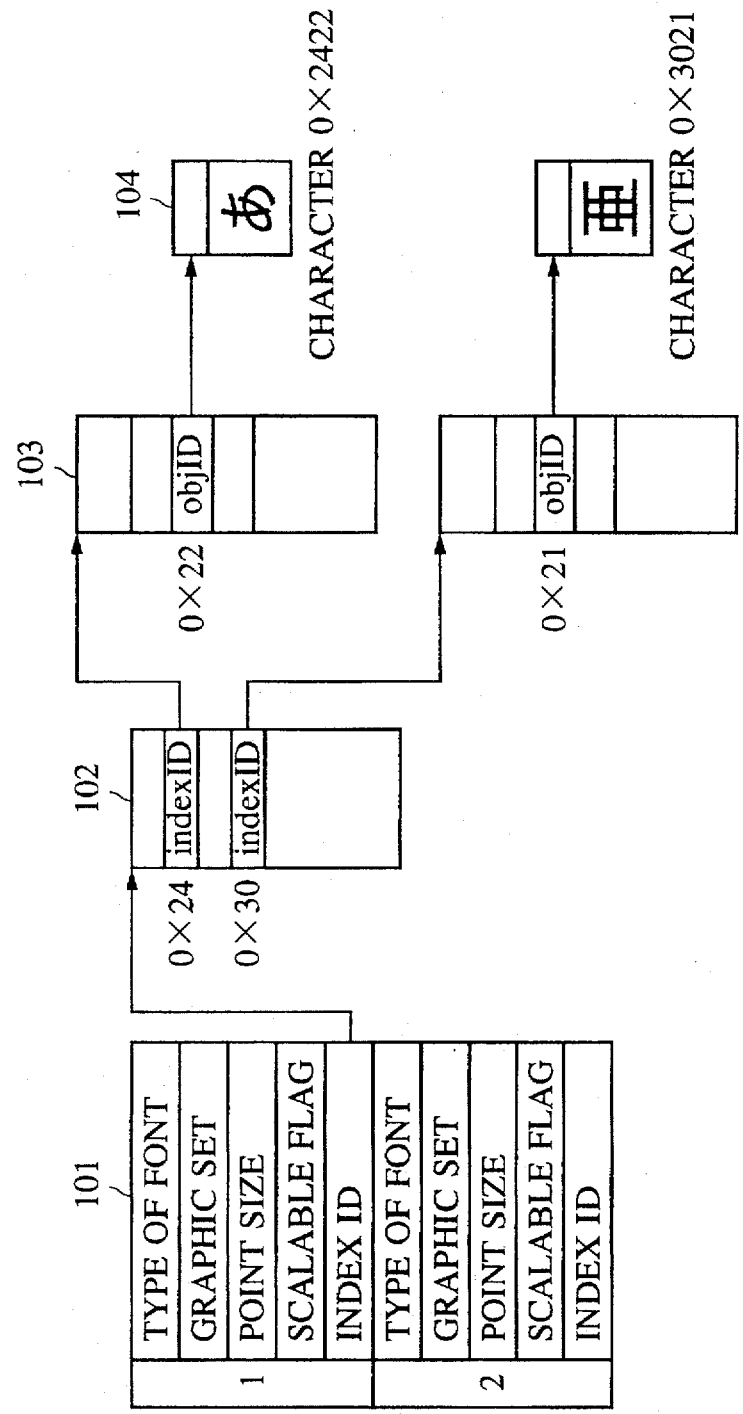
FIG. 10 is a schematic diagram illustrating the structure of a font cache section in accordance with a fourth embodiment of the present invention.
Figure 11A:
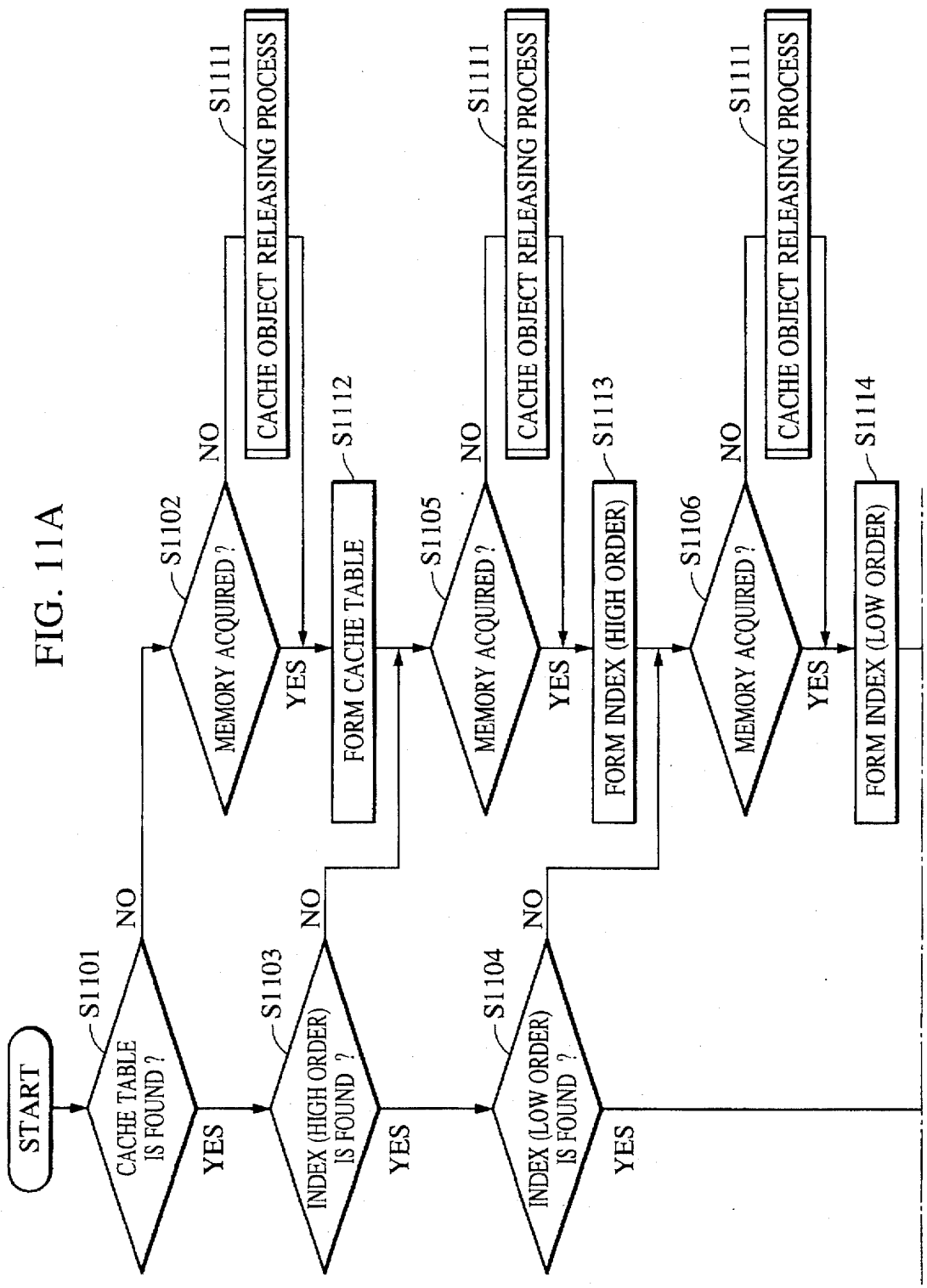
Figure 12:
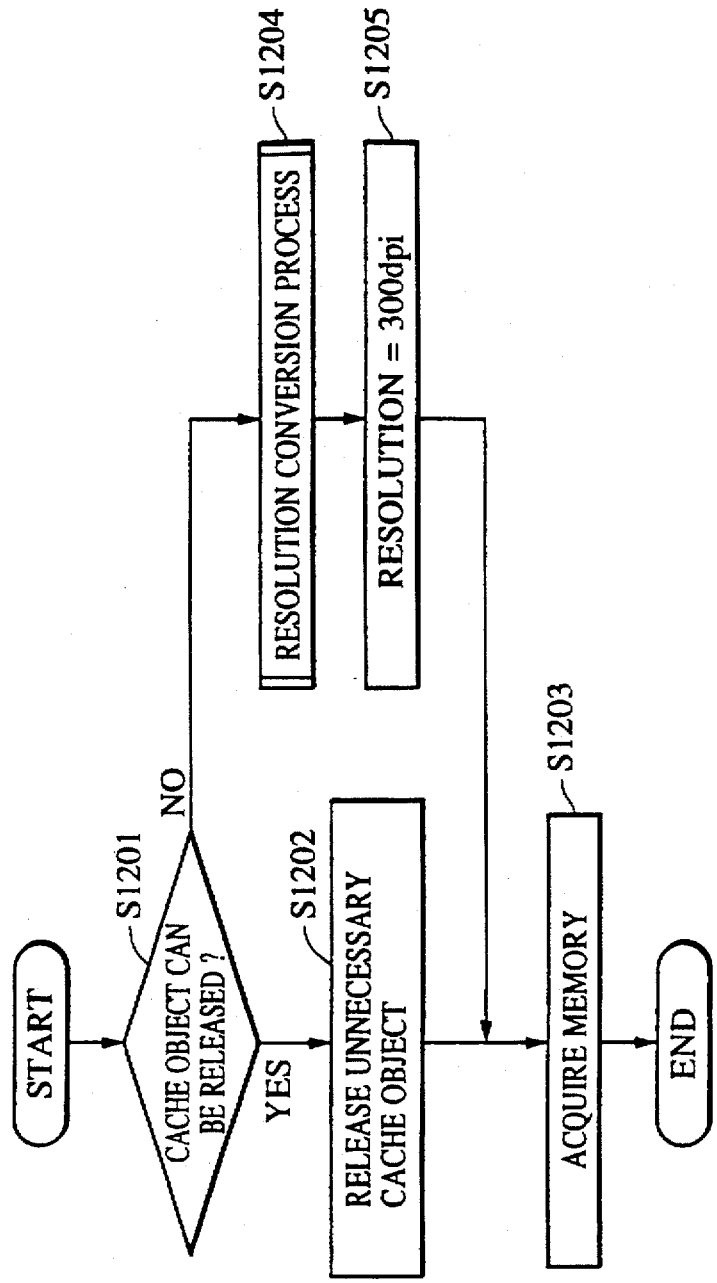
FIG. 12 is a flowchart illustrating the procedure of releasing font cache objects in accordance with the fourth embodiment of the present invention.

With reference to FIGS. 10, 11, and 12, a description will be given below of a procedure for retrieving and forming a font object by using a font cache section.

FIG. 10 is a schematic diagram illustrating the structure of a font cache section in this embodiment. FIGS. 11 and 12 are flowcharts illustrating the procedure for forming a font object when font print data is input in a printer control unit having the construction shown in FIG. 10. The instructions for executing the following operations are stored as a font cache management program in a section of ROM 21.

Initially, in step S1101 of FIG. 11, the font information management table (element 101 in FIG. 10, hereinafter referred to as a "cache table") is retrieved. When no cache table is present or a cache table having the same attributes as the font attributes required in the print data is not found, the process proceeds to step S1102, and a new cache table is formed.

On the other hand, if a matching cache table is found, the retrieval of the index corresponding to the character code specified in the print data is performed in steps S1103 and S1104. In this embodiment, the index is a character code with a maximum length of 2 bytes, and the index has a two-step fixed depth including upper-order bits (102) and lower-order bits (103). For example, the upper-order bits have code 0×00 when using a one byte code system, such as an ANK character system. Alternatively, the depth of the index may be stored in the cache table, and thereby made variable. When an index corresponding to the character code is not found in each of the above-described steps, an index is formed starting in steps S1105 and S1106, respectively.

On the other hand, if an index for the upper- and lower-order bits is found in steps S1103 and S1104, respectively, in the subsequent step S1107, the specified font object is retrieved from among all font objects having that character code (index) by using information (the resolution, the presence or absence of modification, the rotational angle of the pattern, and the like) which is different for each font object. At this point, if a font pattern corresponding to the requested character code and other information is found, it is determined that the cache object has been hit, and the calculations of the print position and the band number to which the character belongs are performed in step S1108. If a font pattern corresponding to the requested character code and other information is not found, a font pattern is formed starting in step S1115. The processes of steps S1109, S1110, S118 and S119, subsequent to step S1108 are the same as those of step S311 (drawing time calculation), and step S312 (application generation), step 313 and step 314, respectively, shown in FIG. 3.

Returning to step S1102, if memory for the new cache table cannot be allocated, an operation of releasing cache objects (according to the process shown in FIG. 12) is performed in step S1111.

In FIG. 12, initially, a check is made in step S1201 to determine if any unnecessary (the word "unnecessary" indicates a determination as to whether or not the font becomes unnecessary after printing has terminated) cache objects are present (and the requested memory size ≦ the sum of the sizes of the unnecessary cache objects). If sufficient unnecessary cache objects are present, the unnecessary font cache objects are released in step S1202, and memory of the size requested in step S1203 is allocated. On the other hand, if there are sufficient cache objects which can be released, the process proceeds to step S1204 where a resolution reduction process is performed, and the stated resolution is set at 300 dpi in step S1205.

On the other hand, if memory can be acquired in step S1102, in the subsequent step S1112, a new cache table is formed on the basis of each font information, and then the process proceeds to step S1105. The same process applies to forming the two indexes and the font object as well. If memory cannot be acquired, the process proceeds to a cache object releasing process which is the same as step S1111. If memory can be acquired, the two indexes are formed in steps S1113 and S1114, respectively, a font object is formed in step S1115, and, if sufficient memory can be allocated, the font object is stored in step S1117. Otherwise, a cache object releasing process is first performed in step S1111.

The object body section in this embodiment has a page counter for indicating from which page a reference is being made. The first time that a font object is hit on a page, the counter is incremented, and when each such page is ejected, the said page counter is decremented. If a reference is being made from two different pages, the page counter becomes 2, and the font object to which a reference is no longer being made from any page becomes 0. In order to increment/decrement the page counter once for each page, the object body also has two page number indicators which increase from the time the power is turned on. One page number indicator is a formation page number indicator which is set to the current page number during formation of the font object or when the font object is hit, and the other is a paper-ejection page number indicator for which after each page is ejected, the application is checked, and the ejection-paper page number indicator is set to the current page number in only font objects which are referenced within the page. If the formation page number indicator does not indicate the current page number during formation of the font object or when the font object is hit, it can be determined to be the first hit within the current page. In a similar manner, also during the paper ejection, the page count can be decremented only once at each page by comparing the ejection-paper page number indicator with the page number of the ejected paper. The page counter was described to always increase. However, if a cache object which has not been referenced over a fixed number of pages (e.g., 32 pages) is released at paper ejection time in order to reduce the RAM, the page number indicators need only count to that fixed number and then reset.

By performing the above-described control, whether reference is being made from only the current page or from other pages can be determined when resolution reduction occurs. If reference is being made from only the current page, the font object in which the resolution is lowered may be stored in the same area as that of the previous object (i.e., at the higher resolution); however, if reference is being made from other pages, other memory for the drawing object is allocated, and another font object is formed (as a result of a reduction in the resolution, the size of the band raster storage section 22b is reduced, and an unused area results).

Although in this embodiment the above-described cache table and index are also stored as one type of drawing object in the drawing object storage section 22a, the cache table and index are not actually rasterized. A corresponding application 504 is therefore not present.

[Fifth Embodiment]

Although the fourth embodiment describes a case in which one font object is referenced from a plurality of pages, the present invention may be applied to a case in which a font object is shared among the obverse surface and the reverse surface in a printer control unit having a print section 27 capable of performing printing on both sides of a recording medium. However, during both-sides printing, there is a case in which pages are not ejected in the order as the pages were formed as described in the "Background of the Invention" section. Therefore, it is necessary to compare the numbers according to whether the numbers are equal rather than bigger or smaller when the ejection-paper page number is decremented. In the case of both-sides printing, the sequence in which pages 1, 2, 3, and 4 are printed normally is changed to the sequence 2, 4, 1, and 3. Therefore, whether or not the page number should be decremented can be determined on the basis of only whether or not the page number is equal (in other words, a determination cannot be made based on whether or not the page number is smaller as in the normal case).

As has been described up to this point, according to the present invention, in a case in which there occurs a need to form an image at a resolution different from the original resolution when the drawing object was formed, since means for forming a font object is selected according to the type or size of a font, improved processing becomes possible. For example, priority is placed on processing speed by performing a thinning-out operation on a font having a relatively large size, while priority is placed on print quality by performing rescaling on a font having a small size. Thus, a resolution conversion process appropriate for each font can be performed.

According to the present invention, in a case in which there occurs a need to form an image at a resolution different from the original resolution at which the drawing object was formed, it is possible to prevent the quality of the font pattern after the resolution conversion from deteriorating by forming the image by rescaling a scalable font.

According to the present invention, in a case in which there occurs a need to form an image at a resolution different from the original resolution at which the drawing object was formed, the deterioration of the quality of a font pattern after the resolution conversion can be minimized even for font data which is input or input and then deleted, by making a determination as to whether rescaling is possible.

According to the present invention, in a case in which there occurs a need to form an image at a resolution different from the original resolution when the drawing object was formed, when the dot font expansion ratio and the resolution conversion ratio combination results in an effective expansion ratio of 1, it is possible to avoid the storage of an unnecessary drawing object by using prestored dot font information.

According to the present invention, in a case in which there occurs a need to form an image at a resolution different from the resolution at which a drawing object was formed, the resolution for a page whose resolution is not required to be converted can remain unmodified by creating a new drawing object based on a drawing object which otherwise would be referenced from a plurality of pages. Thus, deterioration of the print quality can be minimized. Further, there is no need to wait for the output of a page which has not been completely developed, and the resolution conversion process of a new page can proceed. Thus, the processing speed can be increased. The reason for the increased processing speed is as follows. When, for example, after a drawing object is formed with the intention of printing pages 1 and 2 at 600 dpi, a situation occurs in which page 2 must be changed to 300 dpi, conventionally, after page 1 has been completely printed, an object at 300 dpi of page 2 is formed.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A printer control unit, comprising:
   drawing object forming means for forming a drawing object described in an intermediate data format on the basis of input print data; and
   selection means for selecting font object forming means according to a font type of a reference drawing object which is a font object when there occurs a need to form an image at a resolution different from the resolution at which the reference drawing object was formed.

2. A printer control unit according to claim 1, wherein said selection means selects font object forming means for forming a font object having a resolution which is different than the resolution of the reference drawing object by performing a thinning-out operation on dot font data when the font type of said reference drawing object is a dot font, and wherein said selection means selects font object forming means for forming a font object having a resolution which is different than the resolution of the reference drawing object by performing rescaling using scalable font data when the font type of said reference drawing object is a scalable font.

3. A printer control unit according to claim 1, further comprising: storage means for storing at least one of scalable font data and dot font data input into said printer control unit; and deleting means for deleting font data stored by said storage means, wherein said selection means makes a determination as to whether said font data has already been deleted when said font data is scalable font data, selects font object forming means for forming a font object by thinning out a font pattern generated on the basis of said scalable font data when said scalable font data has been deleted and for forming a font object by performing rescaling on the basis of said scalable font data when said scalable font data has not been deleted, and selects font object forming means for forming a font object by performing a thinning-out operation when said font is dot font data.

4. A printer control unit according to claim 1, further comprising: input content identification means for identifying contents of input print data having the same character type and the same character code as a pre-formed font object formed from previously input font data, wherein said selection means selects forming means for forming a font object having a resolution which is different than the resolution of the pre-formed font object by thinning out a font pattern without performing rescaling when it is determined by said input content identification means that the input print data have a content which is different than a content of the pre-formed font object in a case in which the pre-formed font object includes a font pattern generated on the basis of previously input scalable font data.

5. A printer control unit according to claim 1, further comprising dot pattern storage means for storing font information in a dot pattern format, wherein said selection means selects font object forming means for forming a font object by using a dot pattern stored in said dot pattern storage means without thinning out a font pattern when a dot font expansion ratio and a resolution conversion ratio combination results in an effective expansion ratio of 1.

6. A printer control unit according to claim 1, further comprising image forming means, wherein said image forming means forms said image at a resolution different from that at which the reference drawing object was formed in a case in which an amount of memory necessary for storing drawing objects on a page on which said image is to be formed is larger than a fixed amount, or in a case in which it is determined that there is an overrun band in the page for which the time required to develop drawing objects onto the overrun band is longer than a time required to output an image in a band to outside.

7. A printer control unit according to claim 1, further comprising: forming means for forming image data on the basis of said drawing object; and printing means for performing printing on the basis of the image data formed by said forming means.

8. A printer control unit according to claim 7, wherein said printing means is a page printer.

9. A printer control unit for drawing an image by retrieving a previously formed font object corresponding to previously input print data when a same character type and the same character code as those of the previously formed font object are requested in current print data and by referring to said previously formed font object when said previously formed font object is present, said printer control unit comprising:
   determination means for determining if previously formed font object is referenced from another page when there occurs a need to form an image at a resolution different from a resolution at the previously formed font object was formed; and
   forming means for forming a font object different from said previously formed font object when it is determined by said determination means that said previously formed font object is referenced from another page.

10. A printer control unit according to claim 9, further comprising both-sides printing means capable of printing on both sides of a recording medium.

11. A printer control method, comprising:
   a drawing object forming step of forming a drawing object described in an intermediate data format on the basis of input print data; and
   a selection step of selecting a font object forming step according to a font type of a reference drawing object which is a font object in a case in which there occurs a need to form an image at a resolution different from that at which the reference drawing object was formed.

12. A printer control method according to claim 11, wherein said selection step selects a font object forming step of forming a font object having a resolution which is different than the resolution of the reference drawing object by performing a thinning-out operation on dot font data when the font type of said reference drawing object is a dot font, and said selection step selects a font object forming step of forming a font object having a resolution which is different than the resolution of the reference drawing object by performing rescaling using scalable font data when the font type of said reference drawing object is a scalable font.

13. A printer control method according to claim 11, further comprising: a storage step of storing at least one of scalable font data and dot font data input; and a deleting step of deleting font data, wherein said selection step makes a determination as to whether said font data has already been deleted when said font data is scalable font data, selects a font object forming step of forming a font object by thinning out a font pattern formed on the basis of said scalable font data when said scalable font data has been deleted and forming a font object by performing rescaling on the basis of said scalable font data when said scalable font data has not been deleted, and selects a font object forming step of forming a font object by performing a thinning-out operation when said font data is dot font data.

14. A printer control method according to claim 11, further comprising: an input content identifying step of identifying contents of input print data having the same character type and the same character code as a pre-formed font object formed from previously input font data, wherein said selection step selects a font object forming step of forming a font object having a resolution which is different than the resolution of the pre-formed font object by thinning out a font pattern without performing rescaling when it is determined by said input content identification step that the input print data have a font of a content which is different than a content of the pre-formed font object in a case in which the pre-formed font object includes a font pattern formed on the basis of previously input scalable font data.

15. A printer control method according to claim 11, comprising: a dot font storage step of storing font information in a dot pattern format, wherein said selection step selects a font object forming step of forming a font object by using a dot pattern stored by said dot font storage step without thinning out a font pattern when a dot font expansion ratio and a resolution conversion ratio combination results in an effective expansion ratio of 1.

16. A printer control method according to claim 11, further comprising an image forming step, wherein said image forming step forms said image at a resolution different from that at which the reference drawing object was formed in a case in which an amount of memory necessary for storing drawing objects on a page on which said image is to be formed is larger than a fixed amount, or in a case in which it is determined that there is an overrun in the band, for which the time required to develop drawing objects onto the overrun band is longer than a time required to output an image in a band.

17. A printer control method according to claim 11, further comprising:
a forming step of forming image data on the basis of said drawing object; and
a printing step of printing the image data formed in said forming step by means of printing means.

18. A printer control method according to claim 17, wherein said printing means is a page printer.

19. A printer control method for retrieving a previously formed font object corresponding to print data input earlier and for drawing an image by referring to said previously formed font object when said font object is present in a case in which a same character type and same character code as those of the previously formed font object are requested in current print data, said printer control method comprising:
a determination step of determining if the previously formed font object is referenced from another page when there occurs a need to form an image at a resolution different from a resolution at which the previously formed font object was formed; and
a forming step of forming a font object different from said previously formed font object when it is determined by said determination step that the previously formed font object is referenced from another page.

20. A printer control method according to claim 19, further comprising a both-sides printing step for performing printing on both sides of a recording medium.

21. A printer control unit according to claim 1, wherein said reference drawing object is referenced from a plurality of pages.

22. A printer control unit according to claim 9, wherein said previously formed font object is referenced from a plurality of pages.

23. A printer control method according to claim 11, wherein said reference drawing object is referenced from a plurality of pages.

24. A printer control method according to claim 19, wherein said previously formed font object is referenced from a plurality of pages.

25. A memory which is accessed by a computer, said memory having stored therein the following programs:
a drawing object forming program for forming a drawing object described in an intermediate data format on the basis of input print data; and
a selection program for selecting a font object forming program according to a font type of a reference drawing object which is a font object in a case in which there occurs a need to form an image at a resolution different from that at which the reference drawing object was formed.

26. A memory which is accessed by a computer, said memory having stored therein a printer control program for retrieving a previously formed font object corresponding to previously input print data and for drawing an image by referring to said previously formed font object when said previously formed font object is present in a case in which a same character type and same character code as those of the previously formed font object are requested in current print data, said printer control program including:
a determination program for determining whether the previously formed font object is referenced from another page when there occurs a need to form an image at a resolution different from a resolution at which the previously formed font object was formed; and
a forming program for forming a font object different from said previously formed font object when it is determined by said determination program that the previously formed font object is referenced from another page.

27. A method for re-writing font objects at a reduced resolution, said method comprising:
inspecting each font object to determine if such font object is a scalable font object or a non-scalable font object;
re-writing each scalable font object by re-reading font information pertaining to the font object and using the font information to form a new font object at the reduced resolution from font data from which such scalable font object was formed; and re-writing each non-scalable font object by thinning out such non-scalable font object to the reduced resolution.

28. A method for re-writing font objects at a reduced resolution, said method comprising:

inspecting each font object to determine if such font object is a rescalable font object or a non-rescalable font object, with a rescalable font object being a scalable font object for which font data from which such scalable font object was formed has not been deleted or changed, and a non-rescalable font object being a font object which is not a rescalable font object;

re-writing each rescalable font object by re-reading font information pertaining to such rescalable font object and using the font information to form a new font object at the reduced resolution from the font data from which such rescalable font object was formed; and re-writing each non-rescalable font object by thinning out such non-rescalable font object to the reduced resolution.

29. A method for managing a cache of font objects in accordance with input print data, said method comprising:

identifying a previously formed font object corresponding to a character code and font attributes specified in the input print data for a current page;

determining whether the previously formed font object is referenced from another page in a case in which a resolution reduction is requested; and forming a new font object when it is determined that the previously formed font object is referenced from another page in a case in which a resolution reduction is requested, wherein the new font object is referenced from the current page and the previously formed font object is referenced from the other page.

30. An apparatus for re-writing font objects at a reduced resolution, said apparatus comprising:

a memory for storing font objects, font data, font information and program instruction sequences; and a processor for executing said program instruction sequences stored in said memory, wherein said program instruction sequences include: (a) inspecting each font object to determine if such font object is a scalable font object or a non-scalable font object; (b) re-writing each scalable font object by re-reading font information pertaining to the font object and using the font information to form a new font object at the reduced resolution from font data from which such scalable font object was formed; and (c) re-writing each non-scalable font object by thinning out such non-scalable font object to the reduced resolution.

31. An apparatus for re-writing font objects at a reduced resolution, said apparatus comprising:

a memory for storing font objects, font data, font information and program instruction sequences; and a processor for executing said program instruction sequences stored in said memory, wherein said program instruction sequences include: (a) inspecting each font object to determine if such font object is a rescalable font object or a non-rescalable font object, with a rescalable font object being a scalable font object for which font data from which such scalable font object was formed has not been deleted or changed, and a non-rescalable font object being a font object which is not a rescalable font object; (b) re-writing each rescalable font object by re-reading font information pertaining to such rescalable font object and using the font information to form a new font object at the reduced resolution from the font data from which such rescalable font object was formed; and (c) re-writing each non-rescalable font object by thinning out such non-rescalable font object to the reduced resolution.

32. An apparatus for managing a cache of font objects in accordance with input print data, said apparatus comprising:

a memory for storing font objects, input print data, font data and program instruction sequences; and a processor for executing said program instruction sequences stored in said memory, wherein said program instruction sequences include: (a) identifying a previously formed font object corresponding to a character code and font attributes specified in the input print data for a current page; (b) determining whether the previously formed font object is referenced from another page in a case in which a resolution reduction is requested; and (c) forming a new font object when it is determined that the previously formed font object is referenced from another page in a case in which a resolution reduction is requested, wherein the new font object is referenced from the current page and the previously formed font object is referenced from the other page.

* * * * *